United States Patent
Said et al.

(10) Patent No.: US 10,412,415 B2
(45) Date of Patent: Sep. 10, 2019

(54) METHOD AND APPARATUS FOR DECODING/ENCODING VIDEO SIGNAL USING TRANSFORM DERIVED FROM GRAPH TEMPLATE

(71) Applicant: LG ELECTRONICS INC., Seoul (KR)

(72) Inventors: Amir Said, San Jose, CA (US); Hilmi Enes Egilmez, San Jose, CA (US)

(73) Assignee: LG Electronics Inc., Seoul (KR)

(*) Notice: Subject to any disclaimer, the term of this patent is extended or adjusted under 35 U.S.C. 154(b) by 4 days.

(21) Appl. No.: 15/521,410

(22) PCT Filed: Oct. 23, 2015

(86) PCT No.: PCT/KR2015/011276
§ 371 (c)(1),
(2) Date: Apr. 24, 2017

(87) PCT Pub. No.: WO2016/064242
PCT Pub. Date: Apr. 28, 2016

(65) Prior Publication Data
US 2017/0318311 A1    Nov. 2, 2017

Related U.S. Application Data

(60) Provisional application No. 62/067,990, filed on Oct. 24, 2014.

(51) Int. Cl.
*H04N 19/12* (2014.01)
*H04N 19/14* (2014.01)
(Continued)

(52) U.S. Cl.
CPC ........... *H04N 19/60* (2014.11); *H04N 19/103* (2014.11); *H04N 19/107* (2014.11); *H04N 19/12* (2014.11);
(Continued)

(58) Field of Classification Search
CPC ...... H04N 19/60; H04N 19/103; H04N 19/12; H04N 19/14
See application file for complete search history.

(56) References Cited

U.S. PATENT DOCUMENTS 5,122,873 A * 6/1992 Golin ................... H04N 5/9262
375/240.23
2011/0206288 A1   8/2011 Lee et al.
(Continued)

FOREIGN PATENT DOCUMENTS

JP    2009514034 A    4/2009
JP    2014007477 A    1/2014
(Continued)

OTHER PUBLICATIONS

Kim "Graph-Based Transforms for Depth Video Coding", ICASSP 2012, pp. 813-816. (Year: 2012).*
(Continued)

*Primary Examiner* — Jamie J Atala
*Assistant Examiner* — Michael Robert Cammarata
(74) *Attorney, Agent, or Firm* — Fish & Richardson P.C.

(57) ABSTRACT

A method for decoding a video signal using a graph-based transform, where the method includes: receiving a template index for a target unit from the video signal, wherein the template index indicates a graph-based transform template to be applied to the target unit; deriving a graph-based transform matrix for the target unit corresponding to the template index; and decoding the target unit based on the graph-based transform matrix. In some scenarios, this enables efficient compression of inter-predicted residual blocks by using graph-based transform templates. The graph-based transform template may enable adaptive transform selection, thus achieving improved coding gain. Further, by defining a graph-based transform template or a template index, coding with a low-complexity is enabled
(Continued)

that can reduce the number of bits to be transmitted to the decoder.

8 Claims, 14 Drawing Sheets

(51) Int. Cl.
    *H04N 19/60*     (2014.01)
    *H04N 19/176*     (2014.01)
    *H04N 19/103*     (2014.01)
    *H04N 19/107*     (2014.01)
    *H04N 19/124*     (2014.01)

(52) U.S. Cl.
    CPC ........... *H04N 19/124* (2014.11); *H04N 19/14* (2014.11); *H04N 19/176* (2014.11)

(56) References Cited

U.S. PATENT DOCUMENTS

| | | | |
|---|---|---|---|
| 2013/0272422 A1 | 10/2013 | Lee et al. | |
| 2014/0164410 A1* | 6/2014 | Studer | G06F 17/30371 |
| | | | 707/756 |
| 2017/0238019 A1* | 8/2017 | Said | H04N 19/124 |
| | | | 375/240.18 |
| 2018/0146195 A1* | 5/2018 | Koo | H04N 19/122 |
| 2018/0167618 A1* | 6/2018 | Lee | H04N 19/176 |

FOREIGN PATENT DOCUMENTS

| | | |
|---|---|---|
| JP | 2013513333 A | 4/2014 |
| KR | 20100077641 | 7/2010 |
| KR | 10-2012-0005927 | 1/2012 |
| KR | 10-2012-0126067 | 11/2012 |
| KR | 10-2014-0068269 | 6/2014 |
| WO | WO-2017065795 A1 * | 4/2017 ............ G06F 17/00 |

OTHER PUBLICATIONS

Shen "Edge-Adaptive Transforms for Efficient Depth Map Coding, 28th Picture Coding Symposium", PCS2010, Dec. 8-10, 2010, Nagoya, Japan, pp. 566-569. (Year: 2010).*

Zhang "Analyzing the Optimality of Predictive Transform Coding Using Graph-Based Models", IEEE Signal Processing Letters, vol. 20, No. 1, Jan. 2013 (Year: 2013).*

Gokhan, "Approximation and Compression With Sparse Orthonormal Transforms", IEEE Transactions on Image Processing, vol. 24, No. 8, Aug. 2015. (Year: 2015).*

Fracastoro, "Graph-based Transform Coding with Application to Image Compression" arXiv:1712.06393v2 [cs.IT] Dec. 28, 2017 (Year: 2017).*

H. E. Egilmez, A. Said, Y. Chao and A. Ortega, "Graph-based transforms for inter predicted video coding," 2015 IEEE International Conference on Image Processing (ICIP), Quebec City, QC, 2015, pp. 3992-3996.doi: 10.1109/ICIP.2015.7351555 (Year: 2015).*

Y. Ye and M. Karczewicz, "Improved h.264 intra coding based on bi-directional intra prediction, directional transform, and adaptive coefficient scanning," 2008 15th IEEE International Conf (Year: 2008).*

Y. Wang, A. Ortega and G. Cheung, "Intra predictive transform coding based on predictive graph transform," 2013 IEEE International Conference on Image Processing, Melbourne, VIC, 2013, pp. 1655-1659.doi: 10.1109/ICIP.2013.6738341 (Year: 2013 ).*

D. Liu and M. Flierl, "Motion-Adaptive Transforms Based on Vertex-Weighted Graphs," 2013 Data Compression Conference, Snowbird, UT, 2013, pp. 181-190.doi: 10.1109/DCC.2013.23 (Year: 2013).*

S. Takamura and A. Shimizu, "On intra coding using mode dependent 2D-KLT," 2013 Picture Coding Symposium (PCS), San Jose, CA, 2013, pp. 137-140.doi: 10.1109/PCS.2013.6737702 (Year: 2013).*

Zhang et al., "Analyzing the Optimality of Predictive Transform Coding Using Graph-Based Models," IEEE Signal Processing Letters, Jan. 2013, 20(1):106-109.

Shuman et al., "The emerging field of signal processing on graphs: Extending high-dimensional data analysis to networks and other irregular domains," IEEE Signal Processing Magazine, May 2013, 30(3):83-98.

International Search Report in International Application No. PCT/KR2015/011276, dated Feb. 25, 2016, 7 pages.

Hu et al., "Multiresolution Graph Fourier Transform for Compression of Piecewise Smooth Images." IIEE Transactions on Image Processing, vol. 24, No. 1, Jan. 2015, 16 pages.

Takamura et al., "On Intra Coding Using Mode Dependent 2D-KLT," NTT Media Intelligence Laboratories, Yokosuka, Kanagawa, Japan, Jan. 2013, 4 pages.

Hilmi et al., "Graph Based Transforms for Inter Predicted Video Coding," Signal & Image Processing Institute, Los Angeles, California, Jan. 2015, 6 pages.

Kim et al., "Graph Based Transforms for Depth Video Coding," 2012 IEEE International Conference on Acoustics, Speech and Signal Processing (ICASSP), Mar. 25, 2012, 4 pages.

European Extended Search Report in European Application No. 15851689.8, dated Jun. 22, 2018, 8 pages.

* cited by examiner (a)

(b)

METHOD AND APPARATUS FOR DECODING/ENCODING VIDEO SIGNAL USING TRANSFORM DERIVED FROM GRAPH TEMPLATE

CROSS-REFERENCE TO RELATED APPLICATIONS

This application is the National Stage filing under 35 U.S.C. 371 of International Application No. PCT/KR2015/011276, filed on Oct. 23, 2015, which claims the benefit of U.S. Provisional Applications No. 62/067,990, filed on Oct. 24, 2014, the contents of which are all hereby incorporated by reference herein in their entirety.

TECHNICAL FIELD

The present invention relates to a method and device for encoding/decoding a video signal using graph-based transforms. More particularly, the present invention relates to adaptive transforms based on graph templates.

BACKGROUND ART

Next-generation video content will feature a high spatial resolution, a high frame rate, and high dimensionality of scene representation. Processing such contents will result in a tremendous increase in terms of a memory storage, a memory access rate, and a processing power. Therefore, there is a need to design a coding tool for processing the next generation video content more efficiently.

In particular, a graph is a form of data representation that is useful for describing relationships between pixels. A graph-based signal processing method has been used which expresses the relation between the pixels as the graph and processes a video signal based on the graph. In this graph-based signal processing, each signal sample represents a vertex, and the relationship between the signals is represented by graph edges with positive weights. Such a graph may be used to generalize concepts such as sampling, filtering, and transformation, etc.

Therefore, a more efficient graph-based signal processing method is required not only in the field of video compression but also in many applications.

DISCLOSURE

Technical Problem

Video coding methods use some forms of linear transforms on video data to improve compression. Previously, due to computational complexity constraints, the video coding method used only a single transformation such as DCT, DWT or Hardmard transform. However, better video compression may be performed by using more general linear transforms to fit specific statistical characteristics of the signal in different parts of the video sequence. Generally, in the case of coding using orthogonal transforms, there is a problem that the bit cost for expressing the same is high and the bitrate overhead for transmitting transform coefficients is much larger.

Therefore, in accordance with the present invention, the above problem is solved by indirectly defining an orthogonal transform using a graph-based signal processing technique.

The present invention is to provide a method for defining and signaling a template for a graph-based transform.

In addition, the present invention is to provide an efficient coding method that uses characteristics of a graph by encoding a template graph set for each frame, instead of transmitting a transform coefficient.

Moreover, the present invention is to provide a more efficient coding method by transmitting a template index indicating an optimal transform for each coded block.

Technical Solution

The present invention provides a method for coding a video signal using a transform derived from a graph template.

The present invention provides a method of defining and signaling a graph template.

The present invention provides a coding method that utilizes the characteristics of a graph by encoding a template graph set for each frame.

The present invention provides a more efficient coding method where a template index indicating an optimal transform for each coded block is transmitted.

Advantageous Effects

The present invention enables efficient compression of inter-predicted residual blocks by using the graph-based transform template.

In addition, the graph-based transform template enables adaptive transform selection, thus achieving a better coding gain.

Further, by defining a graph-based transform template or a template index, the present invention may allow coding with a low-complexity and significantly reduce the number of bits to be transmitted to the decoder.

DESCRIPTION OF DRAWINGS

FIG. 7 illustrates sample variances for residual signals in a 4×4 transform block for two kinds of video sequences. FIG. 8 illustrates sample variances for residual signals in an 8×8 transform block for two kinds of video sequences.

BEST MODES

Figure 1:
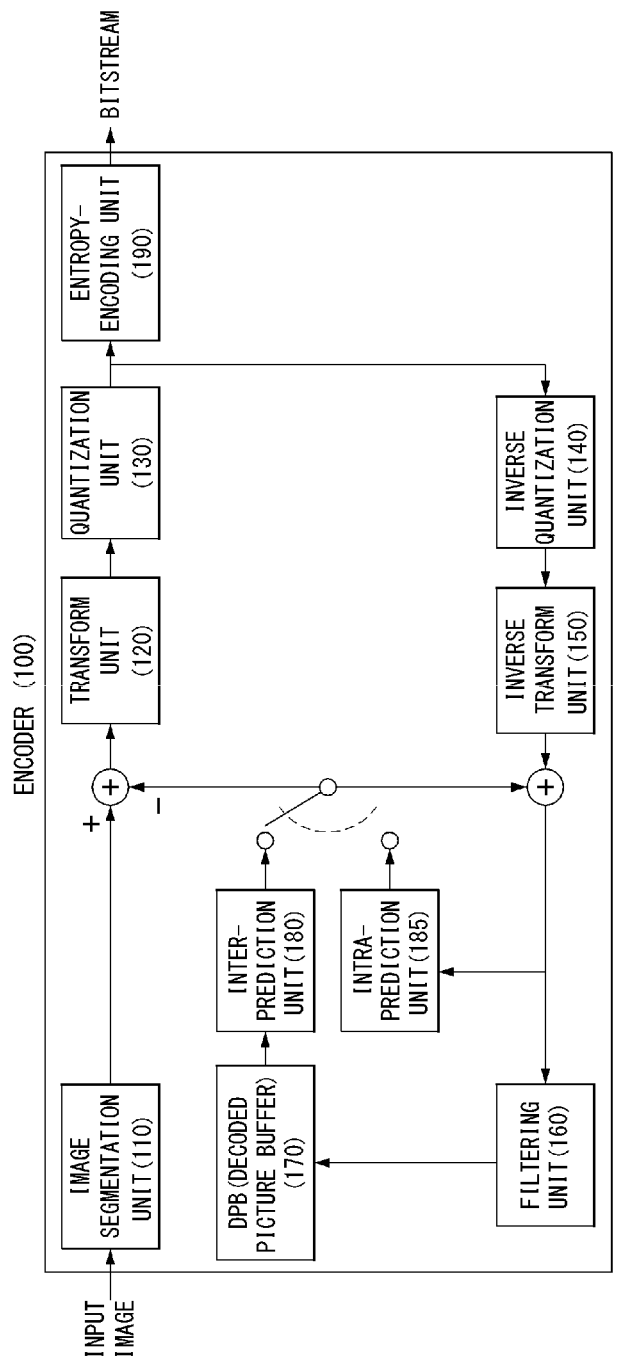
FIG. 1 shows a schematic block diagram of an encoder for encoding a video signal, in accordance with one embodiment of the present invention.

In accordance with an embodiment of the present invention, there is provided a method for decoding a video signal using a graph-based transform, the method comprising: receiving a template index for a target unit from the video signal, wherein the template index indicates a graph-based transform template to be applied to the target unit; deriving a graph-based transform matrix for the target unit corresponding to the template index; and decoding the target unit based on the graph-based transform matrix.

In the present invention, the template index corresponds to one template graph in a predetermined template graph set.

In the present invention, the predetermined template graph set includes a plurality of template graphs, wherein the plurality of template graphs have a pattern in which a corner region in the target unit has a smaller edge weight than other regions in the target unit.

In the present invention, the predetermined template graph set is determined based on a sample pattern of the target unit.

In the present invention, the template index is set to each of a plurality of template graphs.

In accordance with another embodiment of the present invention, there is provided a method for encoding a video signal using a graph-based transform, the method comprising: extracting a graph parameter, wherein the graph parameter includes at least one of a vertex parameter set and an edge parameter set; generating a base template graph based on the graph parameter; generating a template graph set based on adjustment of an edge weight of the base template graph; determining a template graph corresponding to a target unit from the template graph set; and acquiring a graph-based transform kernel through a spectral decomposition of the template graph.

In the present invention, the method further comprises generating a template index corresponding to each of a plurality of template graphs included in the template graph set.

In the present invention, the method further comprises generating a template index corresponding to the template graph set.

In accordance with another embodiment of the present invention, there is provided a device for decoding a video signal using a graph-based transform, the device comprising: an entropy-decoding unit configured to receive a template index for a target unit from the video signal; and an inverse transform unit configured to derive a graph-based transform matrix for the target unit corresponding to the template index, and to perform an inverse-transform on the target unit based on the graph-based transform matrix, wherein the template index indicates a graph-based transform template to be applied to the target unit.

In accordance with another embodiment of the present invention, there is provided a device for encoding a video signal using a graph-based transform, the device comprising: a graph signal generation unit configured: to generate a base template graph based on a graph parameter, wherein the graph parameter includes at least one of a vertex parameter set and an edge parameter set; and to generate a template graph set based on adjustment of an edge weight of the base template graph; a graph-based transform template determination unit configured to determine a template graph corresponding to a target unit from the template graph set; and a graph-based transform acquisition unit configured to acquire a graph-based transform kernel through a spectral decomposition of the template graph.

In the present invention, the device further comprises a template index generation unit configured to generate a template index corresponding to each of the plurality of template graphs included in the template graph set.

In the present invention, the device further comprises a template index generation unit configured to generate a template index corresponding to the template graph set.

Hereinafter, exemplary elements and operations in accordance with embodiments of the present invention are described with reference to the accompanying drawings, however, it is to be noted that the elements and operations of the present invention described with reference to the drawings are provided as only embodiments and the technical spirit and kernel configuration and operation of the present invention are not limited thereto.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process. Further, partitioning, decomposition, splitting, and segmentation, etc. may also be appropriately substituted with each other for each coding process.

Video coding methods use some forms of linear transforms on video data to improve compression. Previously, in order to comply with computational complexity constraints, the video coding method used only a single transformation such as DCT, DWT or Hardmard transform. However, better video compression may be performed by using more general linear transforms to fit specific statistical characteristics of the signal in different parts of the video sequence. In this case, in the case of coding using orthogonal transforms, there is a problem that the bit cost for expressing the same is high and the bitrate overhead for transmitting transform coefficients is much larger.

Therefore, in accordance with the present invention, this problem may be solved by indirectly defining an orthogonal transform using a graph-based signal processing technique. An encoder may encode a template graph set using characteristics of a graph specifically designed for coding a motion-compensated residual signal for each frame, instead of transmitting transform coefficients. Then, a template index indicating an optimal transform for each coded block may be entropy-encoded and transmitted. Hereinafter, more specific embodiments will be described.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, an inverse quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure. The present invention is not limited to the definitions of the terms. In this specification, for convenience of illustration, the term "coding unit" is employed as a unit used in a process of encoding or decoding a video signal. However, the present invention is not limited thereto. Another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square. The transform unit 120 may use a graph-based signal processing method that expresses relationship information between pixels as a graph and processes a video signal using the graph. For example, the transform unit 120 may include a graph-based transform unit. The graph-based transform unit may extract a graph parameter including at least one of a vertex parameter set and an edge parameter set, may generate a base template graph based on the extracted graph parameter, and may adjust an edge weight of the base template graph to generate a template graph set. Then, the graph-based transform unit may determine a template graph corresponding to a target unit using the template graph set. Next, the graph-based transform unit may obtain a graph-based transform kernel via spectral decomposition of the template graph.

Further, in one embodiment of the present invention, the graph-based transform unit may generate a template index corresponding to each of a plurality of template graphs included in the template graph set.

In another embodiment, the graph-based transform unit may generate a template index corresponding to the template graph set.

The graph-based transform unit in accordance the present invention may be embodied as a separate functional unit. In this case, the graph-based transform unit may be located in front of the transform unit 120. However the present invention is not limited thereto.

The quantization unit 130 may quantize the transform coefficient and transmits the quantized coefficient to the entropy-encoding unit 190. The entropy-encoding unit 190 may entropy-code the quantized signal and then output the entropy-coded signal as bitstreams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

On the other hand, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform prediction using an interpolated block composed of the interpolated pixels as a prediction block.

The intra-prediction unit 185 may predict a current block by referring to samples in the vicinity of a block to be encoded currently. The intra-prediction unit 185 may perform a following procedure to perform intra prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction The prediction signal generated via the inter-prediction unit 180 or the intra-prediction unit 185 may be used to generate the reconstructed signal or used to generate the residual signal.

Figure 2:
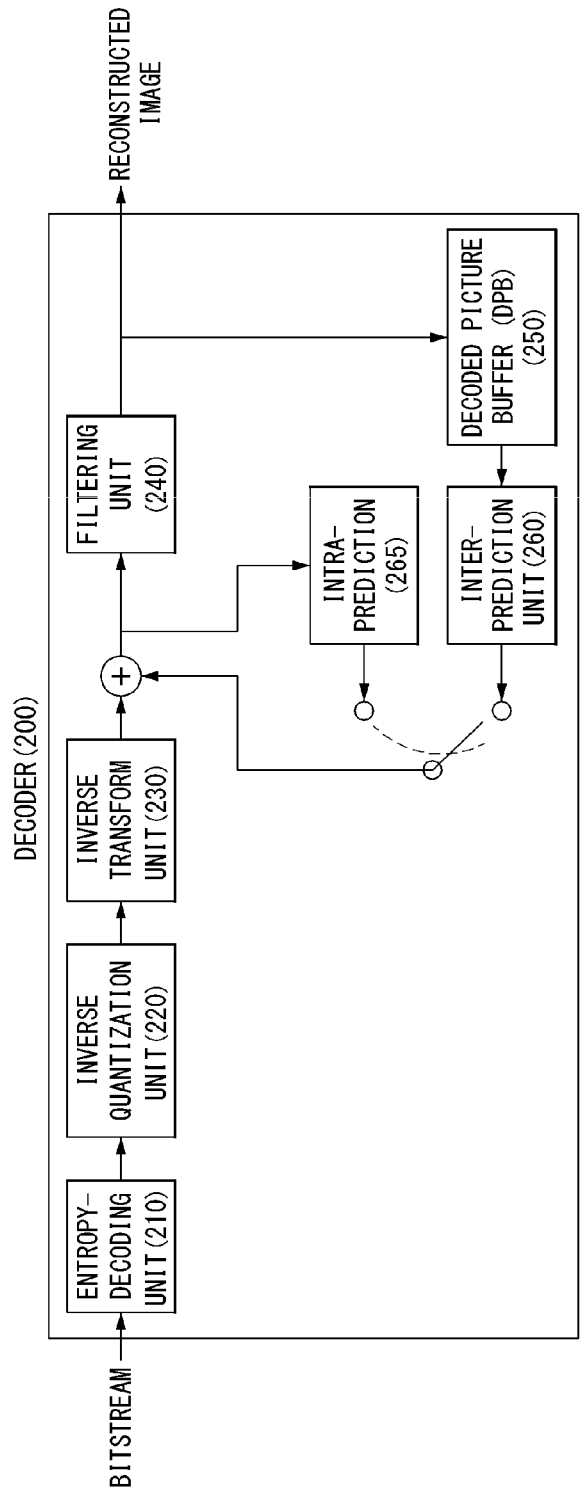
FIG. 2 shows a schematic block diagram of a decoder for decoding a video signal, in accordance with one embodiment of the present invention.

FIG. 2 shows a schematic block diagram of a decoder for decoding a video signal, in accordance with one embodiment of the present invention.

Referring to FIG. 2, a decoder 200 may include an entropy-decoding unit 210, an inverse quantization unit 220, an inverse transform unit 230, a filtering unit 240, a decoded picture buffer (DPB) 250, an inter-prediction unit 260 and an intra-prediction unit 265.

A reconstructed video signal output from the decoder 200 may be reproduced using a reproducing device.

The decoder 200 may receive the signal output from the encoder as shown in FIG. 1. The received signal may be entropy-decoded via the entropy-decoding unit 210.

In one embodiment of the present invention, the decoder or the entropy-decoding unit 210 may receive a template index. In this case, the template index may correspond to each of the template graphs contained in the template graph set. As an alternative, the template index may correspond to the template graph set. The entropy-decoded template index may be transmitted to the inverse quantization unit 220 where the index may be inversely quantized. The inversely quantized index may be transmitted to the inverse transform unit 230 for further use.

The inverse quantization unit 220 may obtain a transform coefficient from the entropy-decoded signal using quantization step size information. In this case, the obtained transform coefficient may be associated with the operations of the transform unit 120 as described above with reference to FIG. 1.

The inverse transform unit 230 may inverse-transform the transform coefficient to obtain a residual signal.

In one embodiment of the present invention, the inverse transform unit 230 may obtain a graph-based transform matrix for the target unit corresponding to the template index, and may perform inverse transform on the target unit using an inverse transform matrix derived from the graph-based transform matrix.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

Figure 3:
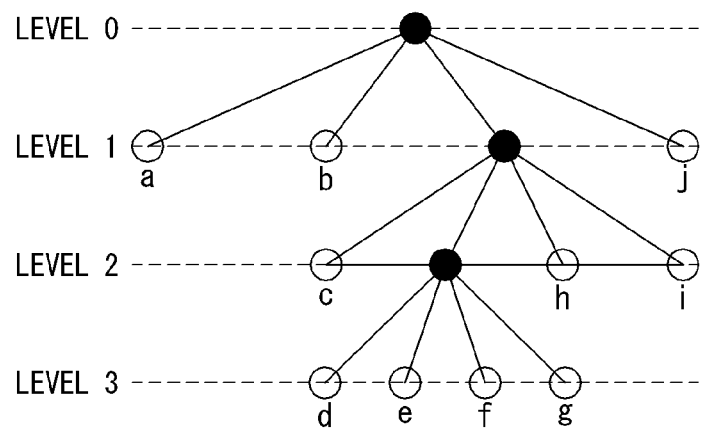
FIG. 3 is a diagram for illustrating a segmentation structure of a coding unit, in accordance with one embodiment of the present invention.
Figure 3:
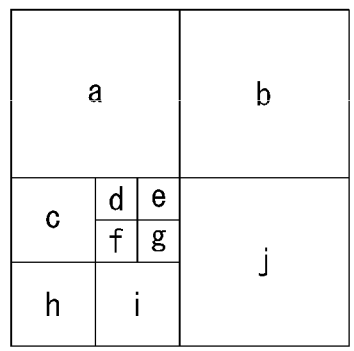

FIG. 3 is a diagram for illustrating a segmentation structure of a coding unit, in accordance with one embodiment of the present invention.

The encoder may segmentalize or divide one image or picture into a rectangular CTU (Coding Tree Unit). Then, the encoder may sequentially encode CTUs one by one according to a raster scan order.

For example, a size of the CTU may be set to 64×64, 32×32, or 16×16. However, the present invention is not limited thereto. The encoder may select the size of the CTU based on a resolution of the input image or characteristics of the input image, etc. The CTU may include a CTB (coding tree block) for a luma component and a CTB (coding tree block) for corresponding two chroma components.

A single CTU may be decomposed into a quadtree (hereinafter, referred to as 'QT') structure. For example, one CTU may be divided into four units, each unit having a square shape, with a length of each side thereof decreasing by one half. This decomposition or division of the QT structure may be performed recursively.

Referring to FIG. 3, a root node of the QT may be related to the CTU. The QT may be partitioned until a leaf node is reached. In this case, the leaf node may be referred to as a coding unit (CU).

The CU may refer to a base unit for a coding process of the input image, for example, a base unit for intra/inter predictions. The CU may include a CB for a luma component and a CB for two chroma components corresponding to the luma component. For example, the size of the CU may be set to 64×64, 32×32, 16×16, or 8×8. However, the present invention is not limited thereto. In the case of a high-resolution image, the size of the CU may be increased or varied.

Referring to FIG. 3, the CTU may correspond to the root node, and may have the smallest depth (that is, level 0). Depending on the characteristics of the input image, the CTU may not be divided. In this case, the CTU corresponds to the CU.

The CTU may be decomposed into a QT form. As a result, sub-nodes, each having a depth of level 1, may be generated. Among the sub-nodes, each having a depth of level 1, a sub-node (i.e., a leaf node) that is not further divided corresponds to a CU. For example, in FIG. 3(*b*), each of the coding units CU(a), CU (b), and CU (j) corresponding to nodes a, b and j respectively are partitioned one time in the CTU and thus has a depth of level 1.

Among the sub-nodes, each having a depth of level 1, at least one sub-node may be further segmentalized into a QT form. Among the sub-nodes, each having a depth of level 2, a sub-node (i.e., a leaf node) that is not further divided corresponds to a CU. For example, in FIG. 3(*b*), each of the coding units CU(c), CU (h), and CU (i) corresponding to nodes c, h and i respectively are partitioned two times in the CTU and thus has a depth of level 2.

Further, among the sub-nodes, each having a depth of level 2, at least one sub-node may be further segmentalized into a QT form. Among the sub-nodes, each having a depth of level 3, a sub-node (i.e., a leaf node) that is not further divided corresponds to a CU. For example, in FIG. 3(*b*), each of the coding units CU(d), CU (e), CU(f) and CU (g) corresponding to nodes d, e, f and g respectively are partitioned three times in the CTU and thus has a depth of level 3.

The encoder may determine a maximum or minimum size of the CU based on the characteristics (for example, resolution) of the video image or the efficiency of coding. Information on the maximum or minimum size and/or information used for deriving the maximum or minimum size may be included in the bitstream. Hereinafter, a CU having a maximum size may be referred to as a LCU (Largest Coding Unit), while a CU having a minimum size may be referred to as a SCU (Smallest Coding Unit).

In addition, a CU having a tree structure may have a predetermined maximum depth information (or maximum level information) and may be hierarchically divided. Further, each divided CU may have depth information. The depth information indicates the number and/or degree of divisions of the CU. Thus, the depth information may include information about the size of the CU.

The LCU is divided into a QT form. Therefore, the size of the SCU may be obtained using the LCU size and the maximum depth information of the tree. Conversely, the size of the SCU and the maximum depth information of the tree may be used to determine the size of the LCU.

For a single CU, information indicating whether or not the CU is divided may be transmitted to the decoder. For example, the information may be defined as a segmentation flag and may be represented by a syntax element "split_cu_flag". The segmentation flag may be included in all CUs except a SCU. For example, when the value of the segmentation flag is '1', the corresponding CU is further divided into four CUs. When the value of the segmentation flag is '0', the corresponding CU is not further divided, and, then, the coding process for the corresponding CU may be performed.

Although, in the embodiment as shown in FIG. 3, the QT structure described above is applied to the CU division by way of example, the QT structure described above may be equally applied to TU (transform unit) division, where the TU is a base unit for performing transform.

The TU may be hierarchically partitioned from the CU to be coded into a QT structure. For example, the CU may correspond to a root node of the tree for the transform unit TU.

The TU is divided into a QT structure. Thus, each of TUs divided from the CU may be further divided into smaller sub-TUs. For example, a size of the TU may be set to 32×32, 16×16, 8×8, or 4×4. However, the present invention is not limited thereto. For high-resolution images, the size of the TU may be larger or may vary.

For a single TU, information indicating whether or not the TU is divided may be transmitted to the decoder. For example, the information may be defined as a segmentation transform flag and may be represented by a syntax element "split_transform_flag".

The segmentation transform flag may be included in all TUs except a STU (smallest TU). For example, when the value of the segmentation transform flag is '1', the corresponding TU is further divided into four TUs. When the value of the segmentation transform flag is '0', the corresponding TU is not further divided, and, then, the coding process for the corresponding TU may be performed.

As described above, CU is a base unit for the coding process in which the intra prediction or inter prediction is performed. In order to more effectively code the input image, the CU may be divided into PUs (Prediction Units).

PU is a base unit forming a prediction block. It is possible to generate different prediction blocks on a PU basis even within a single CU. The PU may be divided differently depending on whether an intra prediction mode or an inter prediction mode is used as a coding mode for a CU to which the PU belongs.

Figure 4:
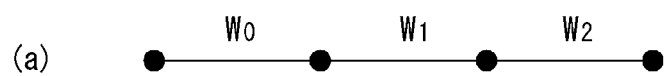
FIG. 4 is a diagram for illustrating a process of obtaining a graph-based transform matrix based on a one-dimensional graph and a two-dimensional graph, according to one embodiment of the present invention.
Figure 4:
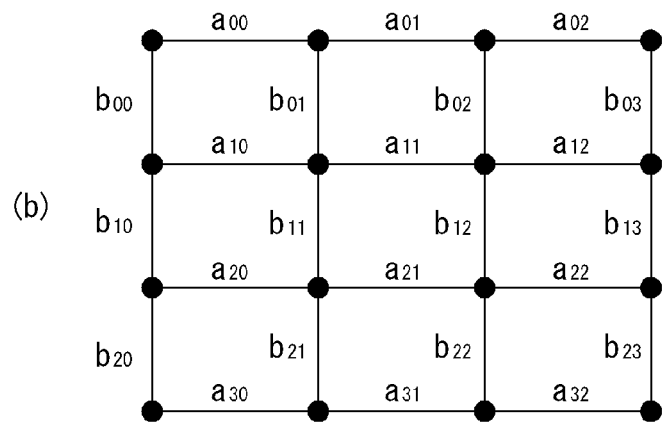

FIG. 4 is a diagram for illustrating a process of obtaining a graph-based transform matrix based on a one-dimensional graph and a two-dimensional graph, according to one embodiment of the present invention.

In one embodiment of the present invention, graph types that may be used for processing a pixel block in an image may be described with reference to FIG. 4. For example, FIG. 4(a) represents a one-dimensional graph corresponding to each line of the pixel block, while FIG. 4(b) represents a two-dimensional graph corresponding to the pixel block.

A graph vertex may be associated with each pixel in the pixel block, and a value of the graph vertex may be represented by a pixel value. Further, a graph edge may refer to a line connecting the graph vertexes. The graph edge may be used to indicate what form statistical dependence in the signal has. A value representing an intensity of the statistical dependence may be called an edge weight.

For example, referring to FIG. 4(a) which represents the one-dimensional graph, 0, 1, 2, and 3 represent positions of the vertexes respectively, and w0, w1, and w2 represent weights of edges between the vertexes respectively. Referring to FIG. 4(b) which represents the two-dimensional graph, aij (i=0,1,2,3, j=0,1,2) and bkl (k=0,1,2, l=0,1,2,3) represent weights of edges between the vertexes respectively.

Each vertex may be connected to any other vertexes. An edge weight of zero may be assigned to an edge that connects non-associated or weakly-associated vertices. However, for simplicity of presentation, an edge with the edge weight of zero may be completely eliminated.

In one embodiment of the present invention, a transform obtained from a graph signal may be defined as a graph-based transform (hereinafter, 'GBT'). For example, provided that the relationship information between pixels constituting a TU is represented by a graph, the transform obtained from this graph may be referred to as the GBT.

The relationship information between the pixels may be defined in various ways. For example, the relationship information between the pixels may be defined based on similarities among pixel values of the pixels, based on whether the pixels belong to the same PU, based on whether the pixels belong to the same object, and the like. The inter-pixel relationship information may be defined based on edge presence/absence between the pixels and edge weight values between the pixels when each of the pixels is matched to the vertex of the graph In this case, the GBT may be obtained through a following process. For example, the encoder or decoder may obtain graph information from a target block in a video signal. From the obtained graph information, a Laplacian matrix L may be obtained using a following equation 1:

$$L = D - A \qquad \text{[equation 1]}$$

where D represents a diagonal matrix, and A represents an adjacency matrix.

Then, the Laplacian matrix L may be subjected to eigen decomposition expressed as a following equation 2 to acquire a GBT kernel:

$$L = U \Lambda U^T \qquad \text{[equation 2]}$$

where L represents a Laplacian matrix, represents an eigen matrix, and $U^T$ represents a transpose matrix. In the equation 2, the eigen matrix U may provide a graph-based Fourier transform that is specific to a signal matching a corresponding graph model. For example, the eigen matrix U, which satisfies the equation 2, may mean a GBT kernel.

Figure 5:
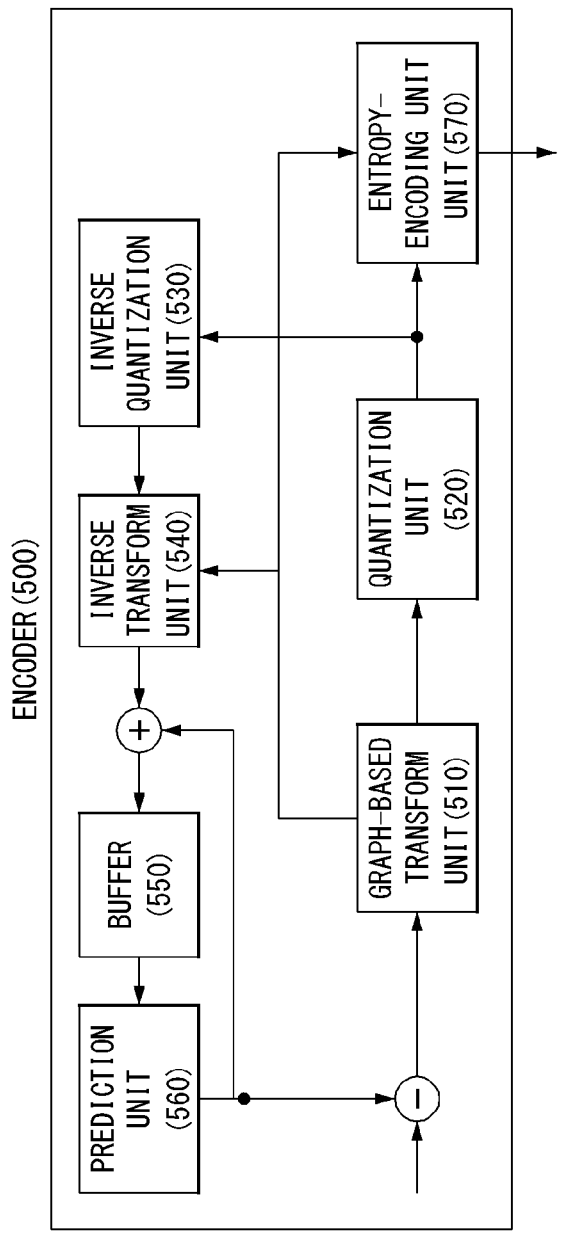
FIG. 5 illustrates a schematic block diagram of an encoder that processes graph-based signals, in accordance with one embodiment of the present invention.

FIG. 5 illustrates a schematic block diagram of an encoder that processes graph-based signals, in accordance with one embodiment of the present invention.

A well-known transforming method depending on signal characteristics is to use KLT (Karhunen-Loveve Transform). However, orthogonal matrices that perform KLT require a large number of bits, and the KLT is a method that is well adapted to signal characteristics. Thus, using the KLT, the compression efficiency is substantially reduced unless the KLT is temporarily updated.

Therefore, the present invention attempts to solve this problem via graph signal processing. In this case, the video signal may be represented as a graph showing an inter-sample signal relationship.

Furthermore, in order to solve the above problem, an edge-adaptive transform (hereinafter referred to as EAT) may be used. However, this EAT also has the problem that signaling for an edge signal in the decoder is too complicated. Thus, the present invention addresses this problem by defining a template graph set that uses some statistical properties of a residual signal.

In the video coding configurations as in FIG. 1 and FIG. 2, a fixed transform, such as DCT, may be used. This assumes that all residual signals implicitly have the same isotropic statistical properties.

However, it may be seen that, in reality, there are very different distributions in terms of video type and pixel block predictions. Therefore, in accordance with the present invention, following assumptions may be made for achieving optimization for complexity and adaptability. However, the present invention is not limited thereto.

First, in accordance with the present invention, a specific linear transform may be selected to be adaptively applied to each video block matching statistical characteristics; and Second, an overhead for transmitting transform matrix data and selecting the transform is relatively small compared to all coding gains.

Based on those assumptions, the present invention provides adaptive transform with a low complexity based on the graph-based transform template, thereby to achieve the optimization for complexity and adaptability. For example, the graph-based transform template in accordance with the present invention may be designed by considering statistical characteristics of an inter-predicted residual signal.

Referring to FIG. 5, an encoder 500 in accordance with the present invention may include a graph-based transform unit 510, a quantization unit 520, an inverse quantization unit 530, an inverse transform unit 540, a buffer 550, a prediction unit 560, and an entropy-encoding unit 570.

The encoder 500 may receive a video signal and subtracts a predicted signal output from the prediction unit 560 from the video signal to generate a residual signal. The generated residual signal may be transmitted to the graph-based transform unit 510. The graph-based transform unit 510 may generate a transform coefficient by applying a transform to the residual signal.

In this case, the present invention proposes a method using a GBT template set having an adaptive and low-complexity property in order to utilize statistical characteristics of the residual signal. The terms as used herein, such as, a GBT template, a graph template, a template graph, a GBT template set, a graph template set, or a template graph set, etc. may be generic terms selected to illustrate the present invention and therefore may be appropriately substituted and interpreted in each coding process.

The graph-based transform unit 510 may extract graph parameters in a graph corresponding to a target unit in the residual signal. For example, the graph parameter may include at least one of a vertex parameter, and an edge parameter. The vertex parameter includes at least one of vertex positions and the number of vertexes. The edge parameter may include at least one of edge weight values and the number of edge weights. Further, the graph parameter may be defined as a set of a certain number of parameters. For example, the edge parameter set may be defined as a weight matrix.

The graph-based transform unit 510 may generate a graph signal based on the extracted graph parameter.

In accordance with the present invention, the generated graph signal may be set to a base template. Hereinafter, it will be called a base template graph. For example, the base template graph may be a uniformly weighted graph. In this case, the uniformly weighted graph may be expressed as $G_{uni}$. The nodes of the graph signal correspond to the pixels of the target unit. All edge weights of the target unit may be set to $W_{uni}$.

In addition, in accordance with the present invention, T different graphs may be generated by adjusting the edge weight set of the base template graph. Hereinafter, the T different graphs may be called a template graph set, which may be expressed using a following Equation 3:

$$\{g_i\}_{i=1}^T \quad \text{[equation 3]}$$

Additionally, in accordance with the present invention, a block-adaptive template graph may be generated by reducing weights of edges around corners in a transform block. For example, the edges around the corners in the transform block may be set to $W_{weak}$, which is an edge weight smaller than $W_{uni}$. In this case, $W_{weak}$ may indicate a weak edge weight.

Furthermore, in accordance with the present invention, the complexity may be reduced by allowing the edges around the corners in the transform block to have the same weak edge weight value $W_{weak}$.

Moreover, in accordance with the present invention, in order to reflect the signal characteristics adaptively based on different positions of the residual blocks, there is provided a method to select T different graphs as a template graph set. Further, in accordance with the present invention, a GBT may be acquired by applying spectral decomposition to the selected template graph set.

The quantization unit 520 may quantize the generated transform coefficient and transmit the quantized coefficient to the entropy-encoding unit 570.

The entropy-encoding unit 570 may perform entropy coding on the quantized signal and output an entropy-coded signal.

The quantized signal output by the quantization unit 520 may be used to generate a prediction signal. For example, the inverse quantization unit 530 and the inverse transform unit 540 in the loop of the encoder 500 may perform inverse quantization and inverse transform on the quantized signal so that the quantized signal is reconstructed as a residual signal. A reconstructed signal may be generated by adding the reconstructed residual signal to the prediction signal output from the prediction unit 560.

The buffer 550 may store therein the reconstructed signal for further reference by the prediction unit 560.

The prediction unit 560 may generate the prediction signal using the previously reconstructed signal stored in the buffer 550. In this case, the present invention relates to efficiently predicting a region in a target image using a region in an anchor image. In this case, the anchor image may refer to a reference image, a reference picture, or a reference frame. The efficiency may be determined by calculating a mean square error that quantifies a rate-distortion cost or distortion in the residual signal.

The present invention proposes a method of identifying vertices and edges in the graph and encoding or decoding a residual value signal. For example, embodiments of the present invention may implement various embodiments via the graph-based transform unit 510. The graph-based transform unit 510 may be included in the encoder 500 or the decoder 700.

Figure 6:
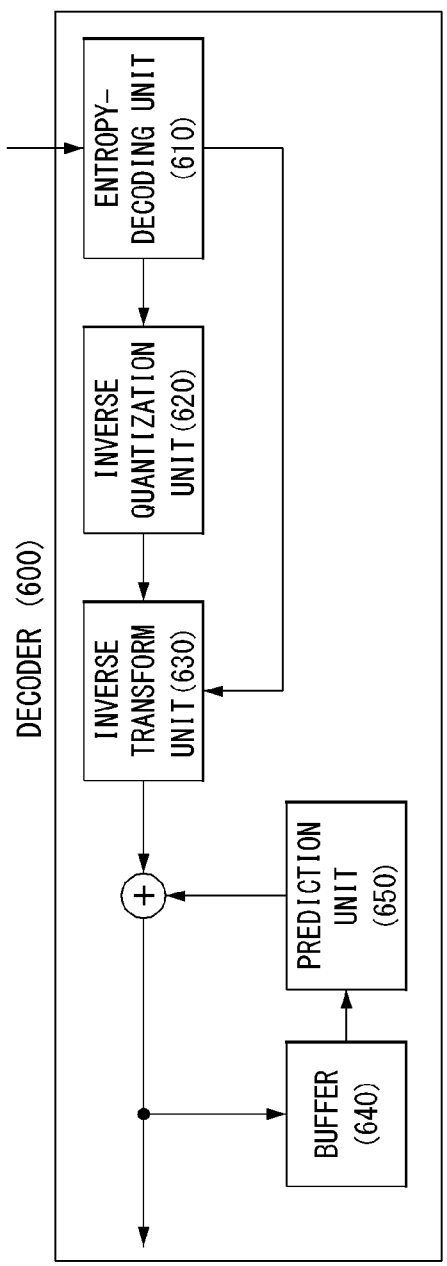
FIG. 6 illustrates a schematic block diagram of a decoder that processes graph-based signals, in accordance with one embodiment of the present invention.

FIG. 6 illustrates a schematic block diagram of a decoder that processes graph-based signals, in accordance with one embodiment of the present invention.

Referring to FIG. 6, a decoder 600 may receive the signal output from the encoder 500 as shown in FIG. 5. The decoder 600 may include an entropy-decoding unit 610, an inverse quantization unit 620, an inverse transform unit 630, a buffer 640 and a prediction unit 650.

The entropy-decoding unit 610 may performs entropy-decoding on the received signal. The inverse quantization unit 620 may obtain a transform coefficient from the entropy-decoded signal based on information on the quantization step size.

The inverse transform unit 630 may acquire a residual signal by performing an inverse transform on the transform coefficient. In this case, the inverse transform may refer to an inverse transform for the graph-based transform obtained from the encoder 500.

In one embodiment of the present invention, the inverse transform unit 630 may receive a template index representing a graph-based transform template and obtain a graph-based transform kernel corresponding to the template index. A transform unit may be reconstructed using the acquired graph-based transform kernel.

By adding the residual signal to the prediction signal output from the prediction unit 650, the reconstructed signal may be generated.

The buffer 640 may store therein the reconstructed signal for further reference by the prediction unit 650.

The prediction unit 650 may generate the prediction signal based on the previously reconstructed signal stored in the buffer 640.

Figure 7:
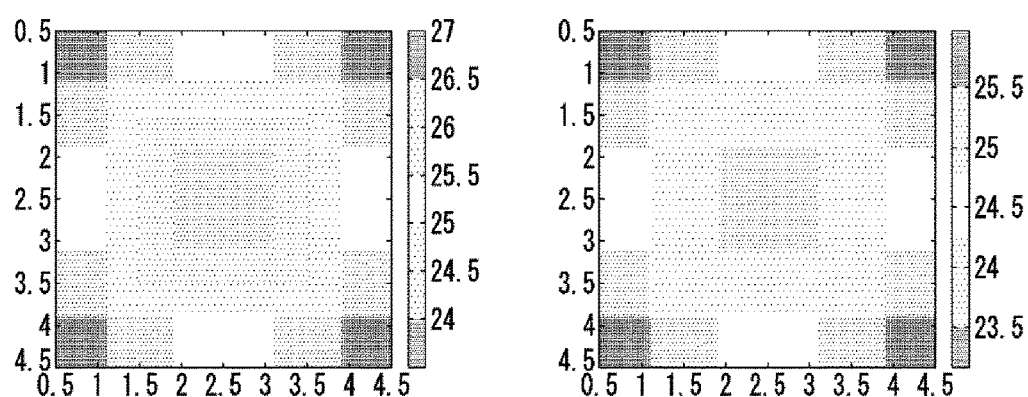
FIG. 7 and FIG. 8 illustrate statistical characteristics of two kinds of video sequences related to sample variances, in accordance with one embodiment of the present invention.
Figure 8:
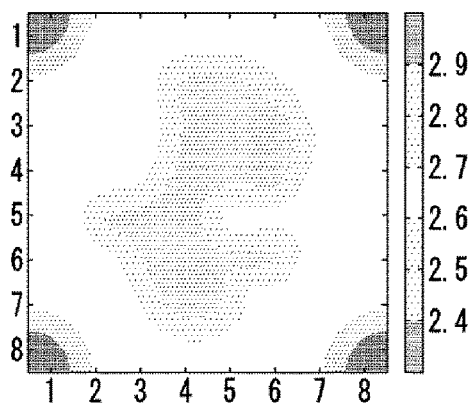
Figure 8:
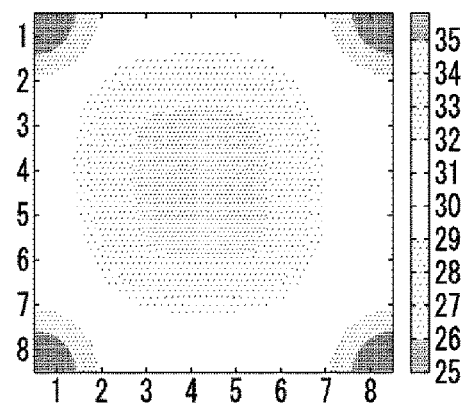

FIG. 7 and FIG. 8 illustrate statistical characteristics of two kinds of video sequences related to sample variances, in accordance with one embodiment of the present invention.

FIG. 7 illustrates sample variances for residual signals in a 4×4 transform block for two kinds of video sequences. FIG. 8 illustrates sample variances for residual signals in an 8×8 transform block for two kinds of video sequences.

Referring to FIG. 7 and FIG. 8, it is confirmed that corner sections of the 4×4 transform block and the 8×8 transform block have larger sample variances than the other sections thereof. This is due to a mismatch between the predicted block in inter-prediction and a reference block. For example, intra-prediction tends to be selected when there is a mismatch in the entire block, whereas inter-prediction tends to be selected when there is a mismatch limited to the corner portions of the block.

Therefore, the present invention intends to define a template graph set covering the corner portions of the transform block, based on the fact that the sample variances in the corner portions of the transform block is larger. Hereinafter, referring to FIG. 9 to FIG. 11, specific examples of the template graph set will be described.

Figure 9:
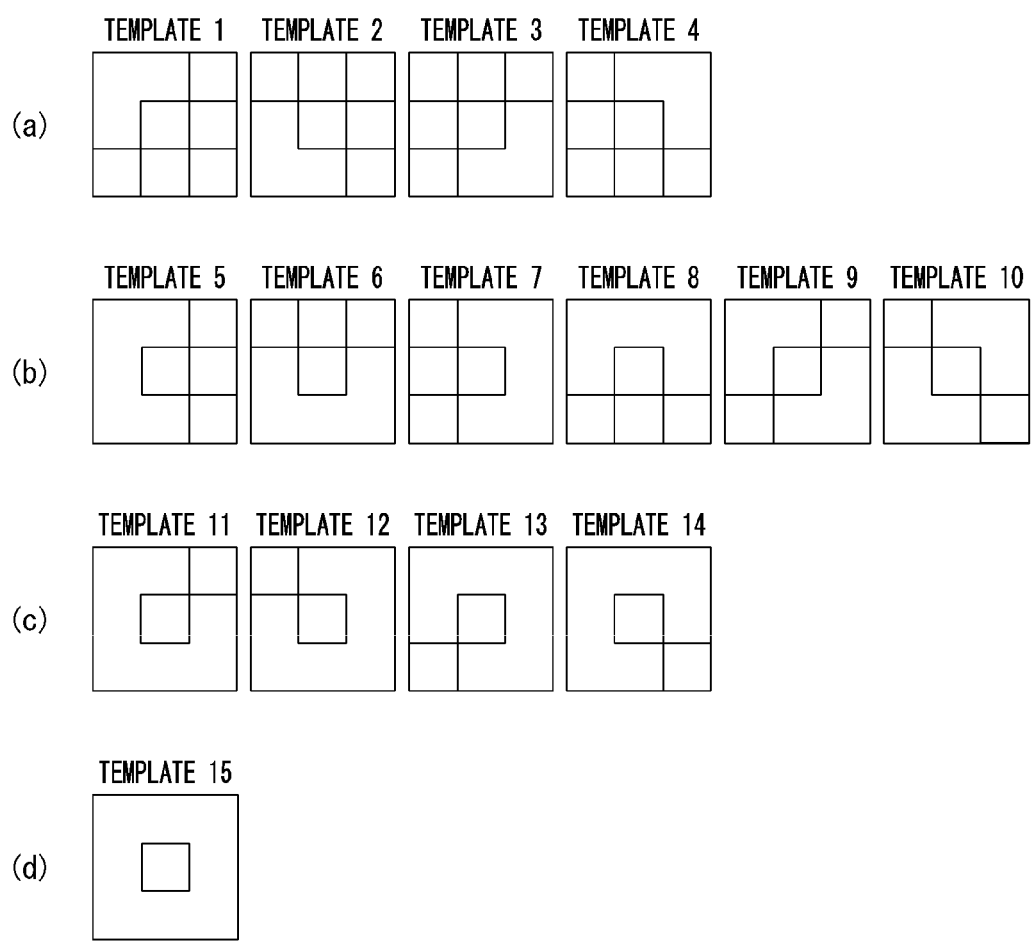
FIG. 9 illustrates 15 template graph sets for a 4×4 block in accordance with one embodiment of the present invention.

FIG. 9 illustrates 15 template graph sets for a 4×4 block in accordance with one embodiment of the present invention.

In one embodiment as shown in FIG. 9, 15 template graph sets are defined for the 4×4 block. However, the present invention is not limited thereto. More template graph sets or fewer template graph sets may be defined for the 4×4 block. In other words, the number of the template graph sets may vary depending on what defines the template graph set. For example, what defines the template graph set may include at least one of an edge weight pattern, a pixel value pattern, and a node connection pattern. As a specific example, in case of the edge weight pattern, a specific pattern may be formed for portions having a weak edge weight in a transform block.

In one embodiment as shown in FIG. 9, specific patterns formed for portions having a weak edge weight in a transform block is shown. For example, assuming that there are four corners in the transform block, the template graph set may be defined based on various combinations of four corner portions.

As a specific example, FIG. 9(*a*) represents a template graph set corresponding to the case where one corner portion has a relatively weak edge weight. That is, a template 1 corresponds to the case where there is a weak edge weight at the left upper corner; a template 2 corresponds to the case where there is a weak edge weight at the lower left corner; a template 3 corresponds to the case where there is a weak edge weight at the lower right corner; and a template 4 corresponds to the case where the upper right corner has a weak edge weight.

As a specific example, FIG. 9(*b*) represents a template graph set corresponding to the case where each of two corner portions has a relatively weak edge weight. In the same manner as in FIG. 9(*a*), all possible combinations of the two corner portions may lead to six templates 5 to 10 as shown in FIG. 9(*b*).

As a specific example, FIG. 9(*c*) represents a template graph set corresponding to the case where each of three corner portions has a relatively weak edge weight. In the same manner as in FIG. 9(*a*) and FIG. 9(*b*), all possible combinations of the three corner portions may lead to four templates 11 to 14 as shown in FIG. 9(*c*).

As a specific example, FIG. 9(*d*) represents a template graph set corresponding to the case where each of four corner portions has a relatively weak edge weight. In this case, all possible combinations of the four corner portions may lead to just one template 15 as shown in FIG. 9(*d*) because in this example, the transform block has only four corners.

Although, as shown in FIG. 9(*a*) to FIG. 9(*d*), the present disclosure is described above based on a number of possible combinations of the corner portions having the weak edge weight, the present disclosure is not limited thereto. The present disclosure may include any combinations between patterns as shown in FIG. 9(*a*) to FIG. 9(*d*).

Figure 10:
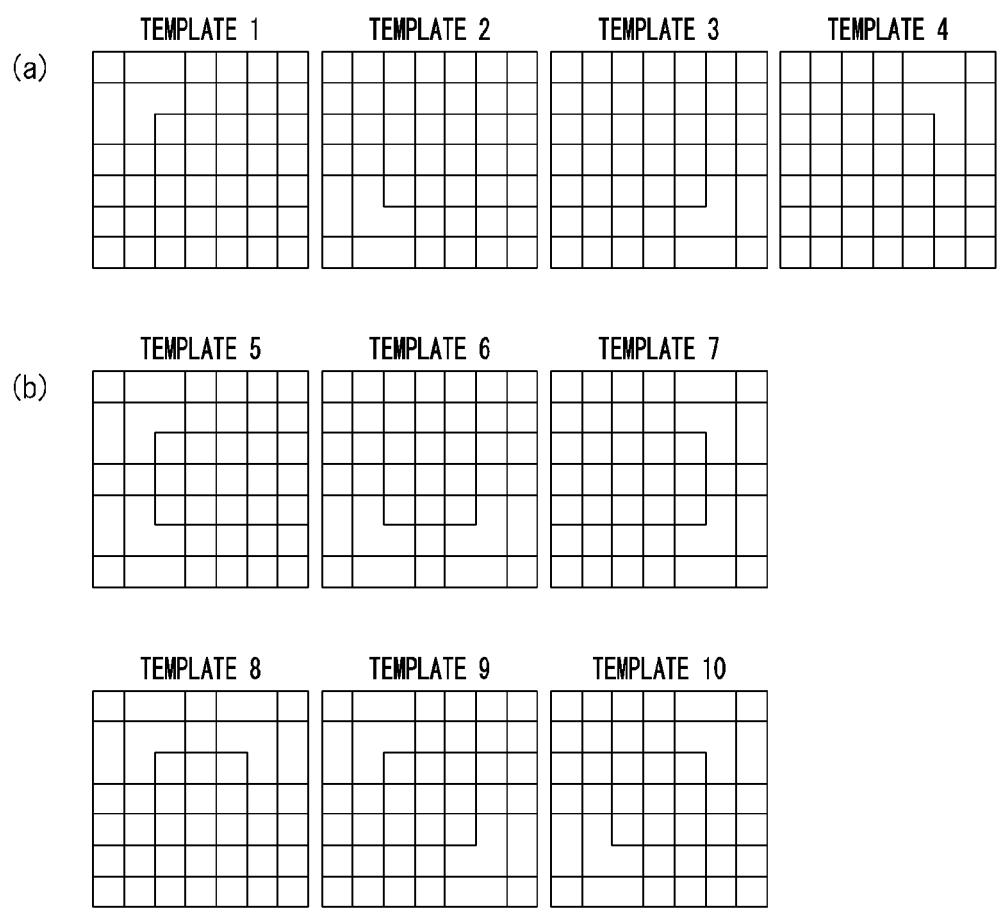
FIG. 10 and FIG. 11 illustrate 15 template graph sets for an 8×8 block in accordance with one embodiment of the present invention.
Figure 11:
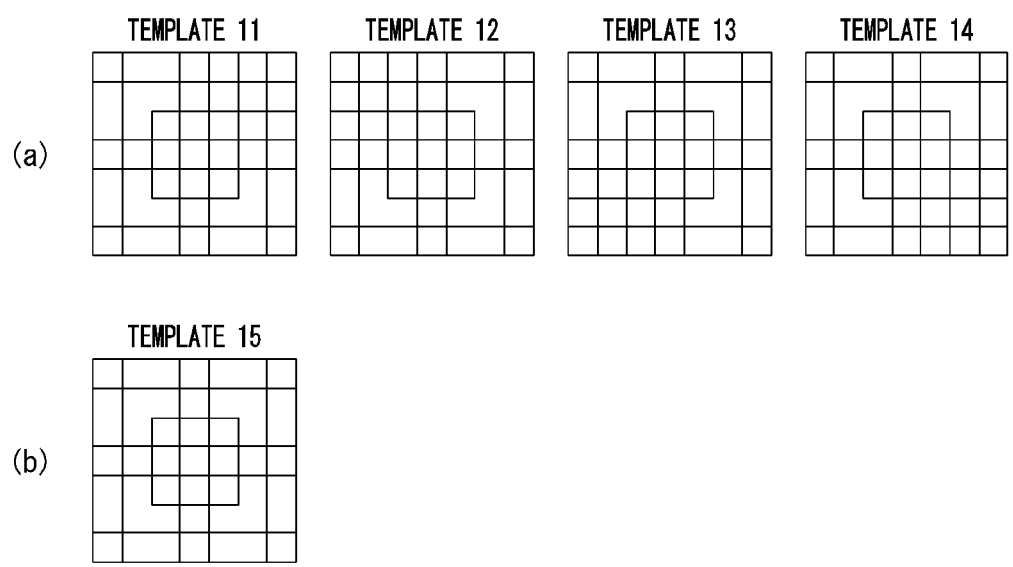

FIG. 10 and FIG. 11 illustrate 15 template graph sets for an 8×8 block in accordance with one embodiment of the present invention.

In one embodiment as shown in FIGS. 10 and 11, 15 template graph sets are defined for the 8×8 block. However, the present invention is not limited thereto. In the same manner as the embodiment in FIG. 9, various patterning methods may be applied. However, where the block has 8×8 size in FIG. 10 and FIG. 11, a larger number of embodiments may be provided based on how a corner having the weak edge weight may be defined.

In FIG. 10 and FIG. 11, it shows that a corner having the weak edge weight has a pattern as shown in FIGS. 10 and 11. If a corner having the weak edge weight are patterned differently from those in FIG. 10 and FIG. 11, different types of a template may be defined, and a larger number of patterns may be defined.

As shown in FIG. 9, FIG. 10(*a*) represents a template graph set corresponding to the case where one corner portion has a relatively weak edge weight, and FIG. 10(*b*) represents a template graph set corresponding to the case where two corner portions have a relatively weak edge weight.

Furthermore, FIG. 11(a) represents a template graph set corresponding to the case where three corner portions have a relatively weak edge weight, and FIG. 11(b) represents a template graph set corresponding to the case where four corner portions have a relatively weak edge weight.

Although, as shown in FIG. 10 to FIG. 11, the present disclosure is described above based on a number of possible combinations of the corner portions having the weak edge weight, the present disclosure is not limited thereto, and the present invention may include any combinations between embodiments as explained in FIG. 9 to FIG. 11.

Figure 12:
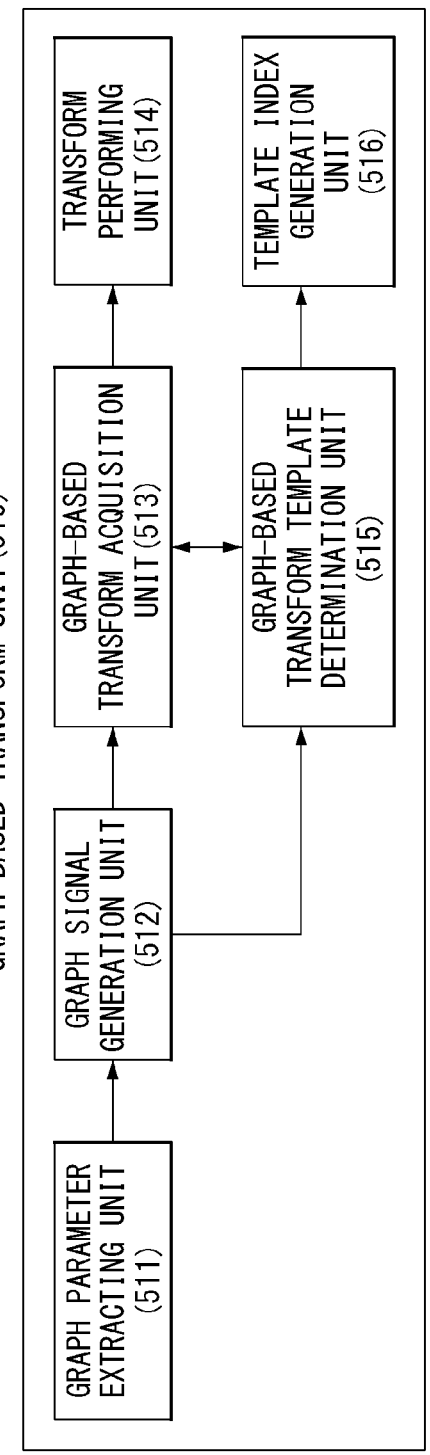
FIG. 12 shows an internal block diagram of a graph-based transform unit according to one embodiment of the present invention.

FIG. 12 shows an internal block diagram of a graph-based transform unit according to one embodiment of the present invention.

Referring to FIG. 12, the graph-based transform unit 510 may include a graph parameter extracting unit 511, a graph signal generation unit 512, a graph-based transform acquisition unit 513, a transform execution unit 514, a graph-based transform template determination unit 515, and a template index generation unit 516.

The graph parameter extracting unit 511 may extract a graph parameter in the graph corresponding to the target unit in the residual signal. For example, the graph parameter may include at least one of a vertex parameter, and an edge parameter. The vertex parameter may include at least one of a vertex position and the number of a vertex. The edge parameter may include at least one of an edge weight value and the number of edge weights. Furthermore, the graph parameter may be defined as a set of a certain number of the parameters.

The graph signal generation unit 512 may generate a graph signal based on the graph parameter extracted from the graph parameter extracting unit 511.

In accordance with the present invention, the generated graph signal may be set to a base template, hereinafter, the set template will be called a base template graph. For example, the base template graph may be a uniformly weighted graph, where the uniformly weighted graph may be expressed as $G_{uni}$. A node of the graph signal corresponds to a pixel of a target unit, all edge weights of the target unit may be set to $W_{uni}$.

The graph signal generation unit 512 may generate T different graphs, that is, a template graph set, by adjusting the edge weight set of the base template graph. The template graph set may be expressed as $\{g_t\}_{t=1}^{T}$ The graph signal generation unit 512 may generate a block-adaptive template graph may by reducing weights of edges around corners in the transform block. For example, the edges around corners in the transform block may be set to $W_{weak}$ which represents an edge weight smaller than $W_{uni}$. In this case, $W_{weak}$ may indicate a weak edge weight. In this case, the edges around the corners in the transform block may have the same value as the weak edge weight $W_{weak}$.

In order to reflect the signal characteristics adaptively based on different positions of the residual blocks, the graph-based transform template determination unit 515 may determine the T different graphs as a template graph set.

The graph-based transform acquisition unit 513 may acquire a graph-based transform kernel through a spectral decomposition of the template graph set.

The transform execution unit 514 may perform a transform using the obtained graph-based transform kernel.

Meanwhile, the template index generation unit 516 may assign a template index to the template graph set determined by the graph-based transform template determination unit 515. Alternatively, the template index generation unit 516 may set individually a template index to each of the T different graphs included in the template graph set. In this case, a template group index may be set separately to the template graph set.

The template index may sent to the entropy encoding unit, and the template index may be entropy-encoded and then be transmitted to the decoder.

Figure 13:
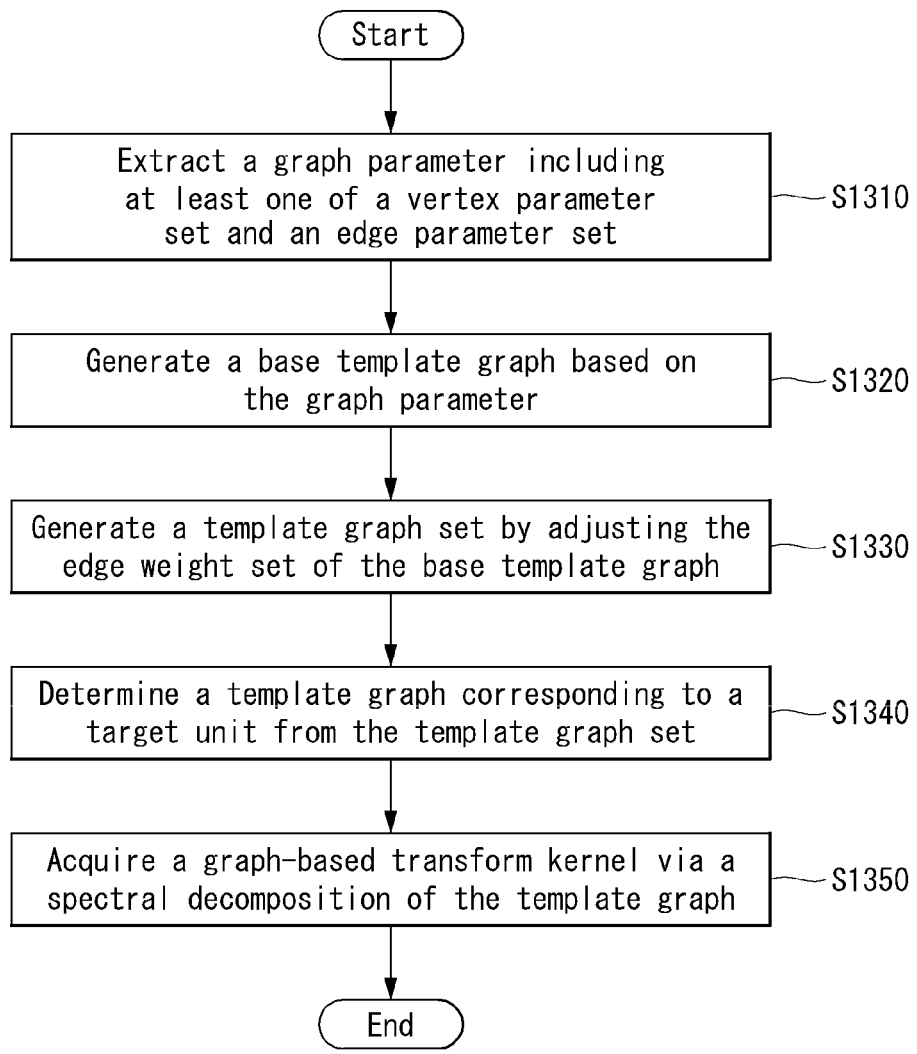
FIG. 13 is a flowchart illustrating a process of acquiring a graph-based transform kernel based on a template graph set according to one embodiment of the present invention.

FIG. 13 is a flowchart illustrating a process of acquiring a graph-based transform kernel based on a template graph set according to one embodiment of the present invention.

The encoder may generate a prediction signal from a received video signal and subtract the prediction signal from the video signal to generate a residual signal. Then, a transform is performed on the residual signal. In this case, a graph-based signal processing technique may be applied to perform the graph-based transform.

The encoder may extract a graph parameter in the graph corresponding to the target unit (for example, transform unit (TU)) in the residual signal (S1310). In this case, the graph parameter may include at least one of a vertex parameter set and an edge parameter set.

The encoder may generate a base template graph based on the graph parameter (S1320). For example, the base template graph may be a uniformly weighted graph, in this case, the uniformly weighted graph may be expressed as $G_{uni}$. A node of the graph signal corresponds to a pixel of a target unit, all edge weights of the target unit may be set to $W_{uni}$.

The encoder may generate a template graph set by adjusting the edge weight set of the base template graph (S1330). In this case, the template graph set may be referred to as a block-adaptive template graph. For example, the edges around the corners in the transform block may be set to $W_{weak}$, which represents an edge weight smaller than $W_{uni}$. In this case, $W_{weak}$ may indicate a weak edge weight. In this case, the edges around the corners in the transform block may have the same value as the weak edge weight $W_{weak}$.

The encoder may determine a template graph corresponding to the target unit from the template graph set (S1340). In this case, a template index may be assigned to the determined template graph set. Alternatively, a template index may be assigned individually to each of the T different graphs included in the template graph set. In this case, a template group index may be set separately to the template graph set.

The encoder may acquire a graph-based transform kernel through a spectral decomposition of the template graph (S1350). The transform may be performed on the target unit based on the acquired graph-based transform kernel.

Figure 14:
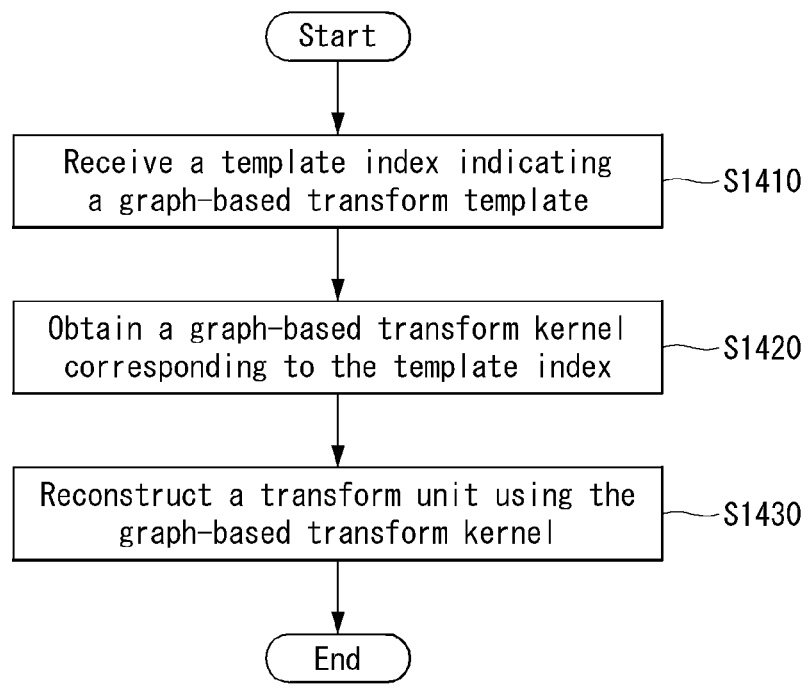
FIG. 14 is a flowchart illustrating a process of performing a graph-based transform using a template index according to an embodiment of the present invention.

FIG. 14 is a flowchart illustrating a process of performing a graph-based transform using a template index according to an embodiment of the present invention.

The decoder may receive the template index corresponding to the target unit from the video signal (S1410). In this case, the template index may be assigned to the template graph set. Alternatively, a template index may be assigned individually to each of T different graphs included in the template graph set.

The decoder may derive a transform matrix for the target unit corresponding to the template index (S1420). For example, the transform matrix may include the graph-based transform kernel corresponding to the template index.

The target unit may be decoded based on the transform matrix (S1430).

In this way, it is possible to efficiently compress the inter-predicted residual block by using the graph-based transform template. Further, the adaptive transform selection is realized, so that a better coding gain may be obtained. Moreover, defining the template index may allow coding with a low complexity, and significant reduction in the number of bits to be transmitted to the decoder.

As described above, the embodiments explained in the present invention may be implemented and performed on a processor, a micro-processor, a controller or a chip. For example, functional modules explained in FIG. 1, FIG. 2, FIG. 5 and FIG. 6 may be implemented and performed on a computer, a processor, a microprocessor, a controller or a chip.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method for decoding a video signal using a graph-based transform, the method comprising:
receiving a template index for a target unit from the video signal, wherein the template index indicates a graph-based transform template to be applied to the target unit;
deriving a graph-based transform matrix for the target unit corresponding to the template index; and
decoding the target unit based on the graph-based transform matrix,
wherein the template index corresponds to one template graph in a predetermined template graph set,
wherein the predetermined template graph set includes a plurality of template graphs, and
wherein the plurality of template graphs have a pattern in which a corner region in the target unit has a smaller edge weight than other regions in the target unit.

2. The method of claim 1,
wherein the predetermined template graph set is determined based on a specific pattern of the target unit, and
wherein the specific pattern includes at least one of an edge weight pattern, a pixel value pattern, and a node connection pattern.

3. A method for encoding a video signal using a graph-based transform, the method comprising:
extracting a graph parameter, wherein the graph parameter includes at least one of a vertex parameter set and an edge parameter set;
generating a base template graph based on the graph parameter;
generating a template graph set based on adjustment of an edge weight of the base template graph;
determining a template graph corresponding to a target unit from the template graph set;
acquiring a graph-based transform kernel through a spectral decomposition of the template graph; and
generating a template index corresponding to each of a plurality of template graphs included in the template graph set,
wherein the template graph set includes a plurality of template graphs, and
wherein the plurality of template graphs have a pattern in which a corner region in the target unit has a smaller edge weight than other regions in the target unit.

4. The method of claim 3,
wherein the template graph set is generated based on a specific pattern of the target unit, and
wherein the specific pattern includes at least one of an edge weight pattern, a pixel value pattern, and a node connection pattern.

5. A device for decoding a video signal using a graph-based transform, the device comprising:
an entropy-decoding unit configured to receive a template index for a target unit from the video signal; and
an inverse transform unit configured to derive a graph-based transform matrix for the target unit corresponding to the template index, and to perform an inverse-transform the target unit based on the graph-based transform matrix,
wherein the template index indicates a graph-based transform template to be applied to the target unit,
wherein the template index corresponds to one template graph in a predetermined template graph set,
wherein the predetermined template graph set includes a plurality of template graphs, and
wherein the plurality of template graphs have a pattern in which a corner region in the target unit has a smaller edge weight than other regions in the target unit.

6. The device of claim 5,
wherein the predetermined template graph set is determined based on a specific pattern of the target unit, and
wherein the specific pattern includes at least one of an edge weight pattern, a pixel value pattern, and a node connection pattern.

7. A device for encoding a video signal using a graph-based transform, the device comprising:
a graph signal generation unit configured to generate a base template graph based on a graph parameter, wherein the graph parameter includes at least one of a vertex parameter set and an edge parameter set, and generate a template graph set based on adjustment of an edge weight of the base template graph;

a graph-based transform template determination unit configured to determine a template graph corresponding to a target unit from the template graph set;

a graph-based transform acquisition unit configured to acquire a graph-based transform kernel through a spectral decomposition of the determined template graph; and a template index generation unit configured to generate a template index corresponding to each of a plurality of template graphs included in the template graph set, wherein the template graph set includes a plurality of template graphs, and wherein the plurality of template graphs have a pattern in which a corner region in the target unit has a smaller edge weight than other regions in the target unit.

8. The device of claim 7, wherein the template graph set is generated based on a specific pattern of the target unit, and wherein the specific pattern includes at least one of an edge weight pattern, a pixel value pattern, and a node connection pattern.

* * * * *